Figure 1:
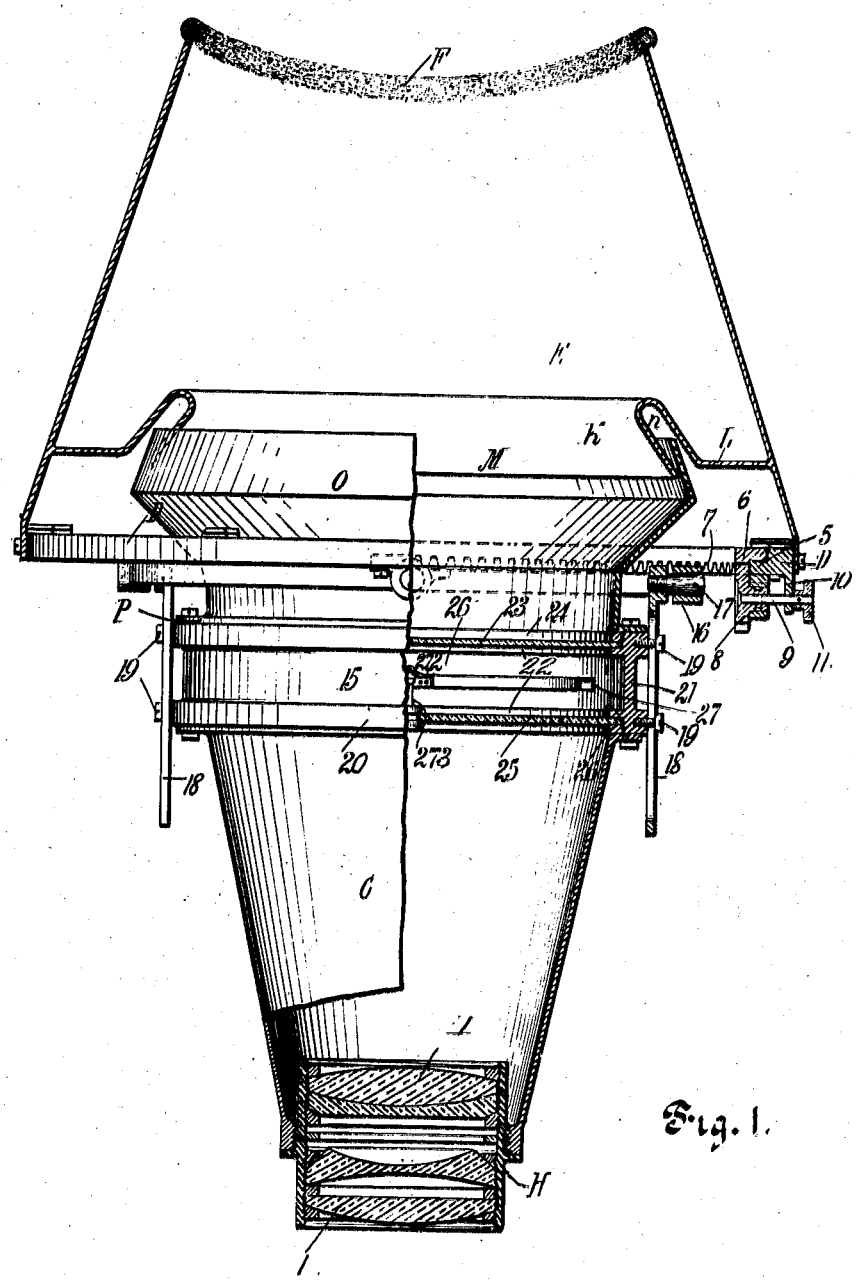

M. VANIMAN.
SPEED AND DIRECTION INDICATOR FOR AIRSHIPS.
APPLICATION FILED FEB. 8, 1912.

1,084,831.

Patented Jan. 20, 1914.
2 SHEETS—SHEET 1.

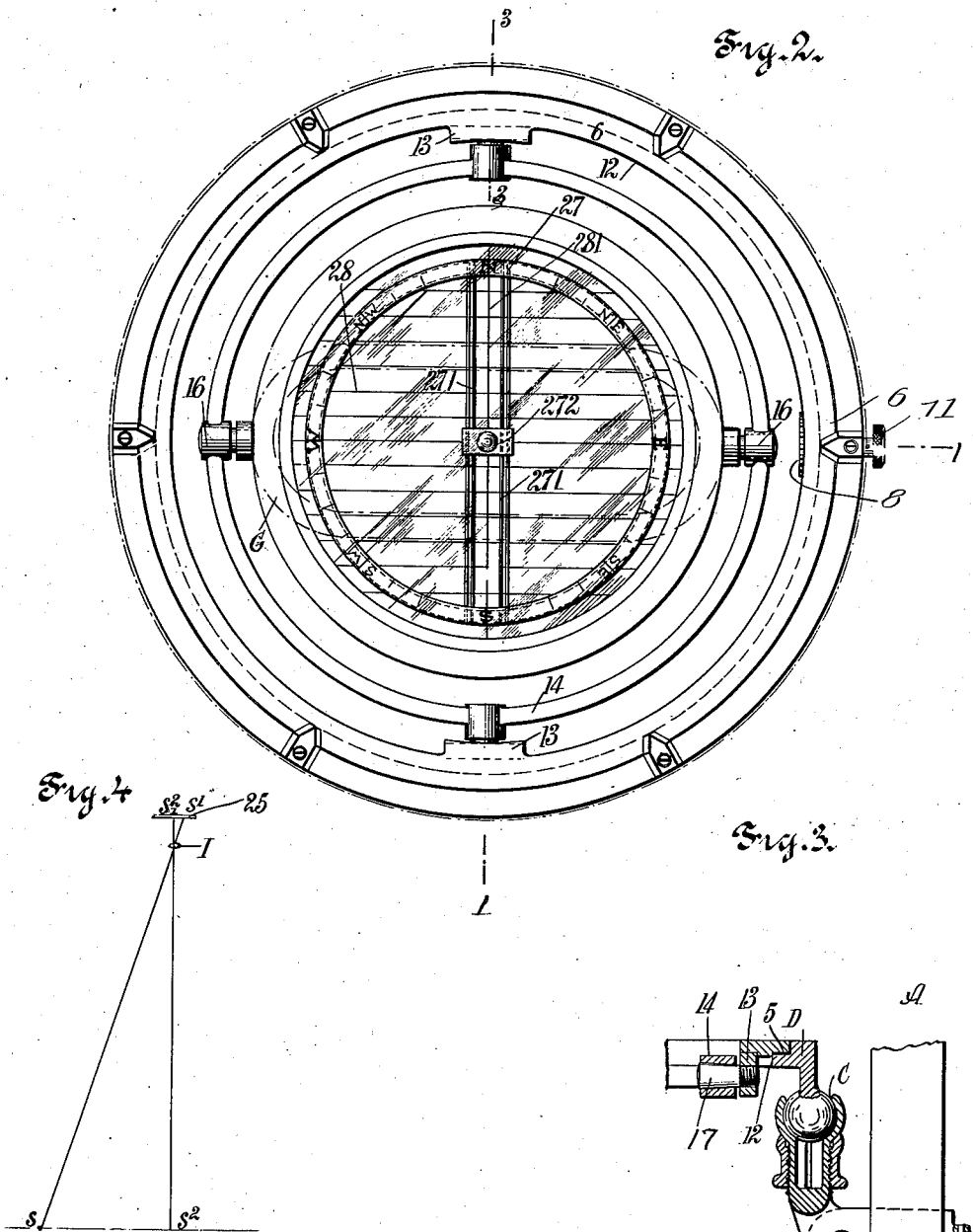

UNITED STATES PATENT OFFICE.

MELVIN VANIMAN, OF ATLANTIC CITY, NEW JERSEY, ASSIGNOR TO INTERNATIONAL AERONAUTICAL CONSTRUCTION COMPANY, A CORPORATION OF MAINE.

SPEED AND DIRECTION INDICATOR FOR AIRSHIPS.

1,084,831. Specification of Letters Patent. Patented Jan. 20, 1914.

Application filed February 8, 1912. Serial No. 676,164.

*To all whom it may concern:*

Be it known that I, MELVIN VANIMAN, a citizen of the United States, and a resident of Atlantic City, in the county of Atlantic and State of New Jersey, have invented a new and Improved Speed and Direction Indicator for Airships, of which the following is a full, clear, and exact description.

With such apparatuses as the balloonist has at his disposal in the existing state of the art, it is difficult for him to obtain any accurate idea of the direction in which, or the speed at which his ship is going. Although supplied with a compass, he cannot even in the case of a long cylindrical dirigible, estimate his direction by determining the angle between his compass needle and the longitudinal axis of the ship, because the drift causes the ship to move in a line which does not coincide with its axis. When the navigator attempts to determine his speed, he is driven to estimate, in the roughest possible manner, using as a basis the time it takes any given object below him to go by.

My invention presents to the balloonist an instrument by which, so long as some point on the surface of the earth is visible, he can tell his direction of motion quite as accurately as can a mariner at sea and by which, so long as the height above the earth is known he can tell his velocity with somewhat similar accuracy. To this end I take any common type of gimbal joint which has a device for turning it, as a whole, in a horizontal plane around a vertical axis and I mount, upon the inner member of the gimbal system, a compass needle, the axis of which is thus kept vertical. Below this needle I fix a ground glass screen having ruled thereon a single diametric line or direction mark, and a series of equally spaced parallel lines at right angles thereto, which furnish displaced distance marks. The ground glass screen, being also mounted upon the inner member of the gimbal structure, tends to maintain its horizontal position just as does the compass needle. Finally in a fixed relation to and below this screen, I mount a lens or projector, preferably of the type used in a photographic camera, which is so arranged as to throw the image of an object on the earth's surface upon the screen.

To determine the direction or motion of the airship with my instrument, it merely becomes necessary to turn the gimbal system and with it the ground glass screen about its vertical axis, being the axis of the compass needle, that is, in a horizontal plane, until the image of some object on the earth's surface moves along a diametrical line on the screen. Due allowance being made for the fact that the projector system usually inverts the image of the object, the direction of motion is determined by reading, from a suitable scale, the angle between the compass needle and the diametrical line along which the image moves.

To determine the speed of the airship, I note the time it takes for an image to pass along the diametrical line from one cross line to the next. The distance between the cross-lines being known, and the height of the balloon being given by the barometer, the speed is determined from a formula in which these elements, as well as the focal lengths of lenses, their distance apart and their distances from the screen, enter. In case a single lens is employed, the calculation becomes simpler; but in any event, so far as the balloonist is concerned, the results of such calculations will be embodied in tables from which he will read his speed directly as soon as he knows the height of his ship and the time taken up by an image to pass across the space between two cross-lines.

Reference is to be had to the accompanying drawings, forming a part of this specification, in which similar characters of reference indicate corresponding parts in all the figures, and in which Figure 1 is a side elevation of a preferred embodiment of my invention taken on the line 1—1 of Fig. 2, certain parts broken away to show internal construction; Fig. 2 is a plan view looking down upon the device shown in Fig. 1 with the hood removed; Fig. 3 is an enlarged sectional view taken on the line 3—3 of Fig. 2; and Fig. 4 is a diagrammatic view, showing the path of light in two limiting positions.

This device, which we will refer to as a "speedometer", is fastened to any suitable support A on a ship, by means of a band B encircling the support A, and a ball-and-socket connection C supporting a frame D. The frame D is of a general circular construction, and is L-shaped in cross section, to form an internal rim shoulder 5. Rotatably mounted upon the shoulder 5, is a ring 6 having a depending rack 7, which rack is engaged by a gear 8 mounted on a shaft 9, which shaft is journaled in a bracket 10 depending from one side of the frame D, and is rotated by means of a thumb screw 11.

Extending inwardly from the inner edge 12 of the rim 6 is a pair of diametrically disposed depending trunnion boxes 13, within each of which is pivoted a trunnion ring 14, as shown more particularly in Fig. 3. Mounted on the ring 14, intermediate the trunnions 13, is a pair of oppositely disposed trunnion boxes 16, carrying a cone-shaped pin 17, the inner end of each of which pins is screw-threaded, said screw-threaded ends engaging the upper end of spaced-apart depending plates 18. Rigidly mounted upon the depending plates 18 and affixed thereto by means of suitable screws 19, is a carriage 20, which carriage is formed of a flat cylinder 21, having a pair of spaced-apart internal flanges 22. Resting upon the upper flange is a clear glass 23, held in position by a threaded retaining ring 24 bearing upon the glass 23 and maintaining the same firmly in contact with the upper flange 22. Forced into position against the lower flange 22, is a ground glass screen 25, retained in position by a ring 26 in threaded engagement with the cylinder 21.

Disposed between the glass 23 and the screen 25, is a compass, preferably comprising a light metal ring 27, of an inverted U-shape in cross section, having a series of parallel magnets 271 disposed on opposite sides of a diameter of said ring, and carrying a centrally-disposed inverted cap 272, by means of which the compass may be pivotally supported on a pin 273 carried centrally on the glass 25. The ground glass screen has ruled thereon a series of parallel lines 28, spaced equi-distant apart, and at right angles to the ruled lines 28 is a diametrical guide line 281 passing through the pivoting point at 273.

Extending upwardly from outside of the frame D, is a hood E, preferably of some stiff fabric, terminating in a peep hole F, by means of which the operator may look into the instrument without the infiltration of extraneous light, as is common with photographic devices of similar character. Projecting inwardly from the side of said hood E, is an annular member K, comprising an outside flange L, the inner side of which is bent into an inverted funnel-shaped member M, forming between two bent parts thereof, an inverted outwardly-extending annular channel $n$. Movable in said channel is the upper circular edge of a member O, the upper portion thereof having an outline of a pair of inverted conical frustums having a common base, and the lower portion thereof being tubular, the lower end of which member is formed into a flange P rigidly fastened to the top of the carriage 20. It will be seen by this construction that the carriage 20 is free to oscillate without inconveniencing the observer at F, and, at the same time, excludes all extraneous light from the ground glass plate 28. Depending from the carriage 20, is a funnel-shaped shell G, preferably of metal, the lower end of which has rigidly mounted therein, a lens frame H and a lens system I, here shown as a photographic lens consisting of three lenses spaced apart. Such lens system is suitable for throwing the image of an object on the surface of the earth upon the ground glass screen 25. Any other lens system or simple lens or similar device capable of effecting the same results may also be employed. Any such optical device, which throws the image of an object on the ground upon the screen, I call a projector.

If it is now desired to determine the direction in which the ship is going, it is merely necessary, by turning the screw 11, to rotate the compass system and its attached parts until the diametrical line or direction mark 281 assumes the direction of the path of the image of an object which is traversing the ground glass screen. Having due regard for the fact that the lens system, in the case shown, is of the type which reverses the image, the direction may be found by reading off the angle between the line 281 on the screen and the compass needle.

Should it be desired to determine the speed of the ship, some stationary object on the ground or water, is taken as a point of reference, and the image of this stationary point is focused on the screen 25 by means of the lens I. The operator rotates the carriage 20 by means of the thumb screw 11 until the direction of movement of the image on the screen is at right angles to the parallel lines 28. Then, by noting the time of transit of the image across one or more of the succeeding lines 28, a basis is afforded for calculating the velocity of the ship. For instance, referring to Fig. 4, a stationary point 8 would have its image on S' on the screen 25, but as the ship progresses, the stationary point S would have moved to the position $S^2$ relative to the ship, and the image of the point $S^2$ would have moved to $S^2_1$. It now becomes a simple problem in optics to determine the speed, since we know the distance of the lens from the earth, the distance of the lens from the ground glass screen 25 and the focal lengths of the lenses. But since such calculation will vary somewhat in the case of different lens systems and since such matters are within the skill of the optician, I will not burden this specification with a specific account of them, but will merely repeat that an approximate table will go with each one of my instruments from which the navigator, knowing his height above the earth and the time occupied for an image to pass from one parallel line 28 to the other, will be able, at once, to read his speed.

It will be noted, from what has just been said, that in so far as my instrument is a direction indicator, it employs the compass and the direction mark or line 281 on the glass screen. In so far as it is a speed indicator, it employs the cross lines 28 but does not utilize the compass. From this it is clear that either the speed or the direction finding function may be used without utilizing the other function.

The mounting of the compass directly over the ground glass screen facilitates the positioning of the lines on the ground glass plate at right angles to the direction of travel of the ship. For instance, if the ship were traveling directly N. E., the carriage 20 would be rotated forty-five degrees to the right, thereby bringing the lines 28 at right angles to the line of travel of the ship.

Having thus described my invention, I claim as new and desire to secure by Letters Patent:

1. The combination of an airship and a speed indicator carried thereby, comprising a screen having spaced distance marks, a projector mounted below the screen to throw the image of some stationary object thereupon, and a rotatable mounting for the screen, so that the image may be brought to travel in proper relation to the distance marks, substantially as described.

2. A speed indicator for airships, comprising in combination, a gimbal joint structure mounted to rotate in a horizontal plane, a screen having spaced distance marks mounted on the inner member of the gimbal structure, a projector mounted below the screen in fixed relation thereto, to throw the image of some stationary object thereupon, and a device to rotate the gimbal structure horizontally to bring the path of the image into appropriate relation with the distance marks, substantially as described.

3. A direction indicator for airships, comprising a gimbal joint structure mounted to rotate in a horizontal plane, a screen mounted on its inner member having a direction mark, a projector below the screen to throw the image of some stationary object thereupon, a compass having its axis mounted in fixed relation with the screen, and means for rotating the gimbal joint structure to bring the path of the image into appropriate relation with the direction mark, substantially as described.

4. A speed and direction indicator for airships, comprising a gimbal joint structure mounted to rotate in a horizontal plane, a screen mounted on its inner member having a direction mark and spaced distance marks, a projector below the screen to throw the image of some stationary object thereupon, a compass having its axis mounted in fixed relation with the screen, and means for rotating the screen in a horizontal plane to bring the path of the image into appropriate relation with the direction or distance marks as the case may be, substantially as described.

In testimony whereof I have signed my name to this specification in the presence of two subscribing witnesses.

MELVIN VANIMAN.

Witnesses:
 W. S. ORTON,
 PHILIP D. ROLLHAUS.